(12) United States Patent
Jones (10) Patent No.: US 9,617,728 B2
(45) Date of Patent: Apr. 11, 2017

(54) ACOUSTIC PANEL (71) Applicant: Geko Innovations Limited, Dublin (IE)

(72) Inventor: Craig Jones, London Greater London (GB)

(73) Assignee: Geko Innovations Limited, Dublin (IE)

( * ) Notice: Subject to any disclaimer, the term of this patent is extended or adjusted under 35 U.S.C. 154(b) by 0 days.

(21) Appl. No.: 14/906,735

(22) PCT Filed: Jul. 24, 2014

(86) PCT No.: PCT/EP2014/065960
§ 371 (c)(1),
(2) Date: Jan. 21, 2016

(87) PCT Pub. No.: WO2015/011241
PCT Pub. Date: Jan. 29, 2015

(65) Prior Publication Data
US 2016/0194866 A1   Jul. 7, 2016

(30) Foreign Application Priority Data
Jul. 24, 2013 (GB) .................................. 1313230.3

(51) Int. Cl.
*E04B 1/86* (2006.01)
*B29C 44/02* (2006.01)
(Continued)

(52) U.S. Cl.
CPC .............. *E04B 1/86* (2013.01); *B29C 44/02* (2013.01); *B29C 44/56* (2013.01); *G10K 11/168* (2013.01);
(Continued)

(58) Field of Classification Search
CPC ........... E04B 1/86; B29C 44/02; B29C 44/56; G10K 11/168; B29K 2075/00; B29K 2007/10; B29L 2007/002
(Continued)

(56) References Cited

U.S. PATENT DOCUMENTS 4,463,049 A * 7/1984 Kracke ..................... E04B 1/86
181/198
4,548,292 A * 10/1985 Noxon .................. E04B 1/8209
181/286
(Continued)

FOREIGN PATENT DOCUMENTS

| CN | 103317807 | 9/2013 |
| WO | 2004028796 A2 | 4/2004 |
| WO | 2006107847 A2 | 10/2006 |

OTHER PUBLICATIONS

PCT International Search Report.
Great Britain International Search Report.

*Primary Examiner* — Forrest M Phillips
(74) *Attorney, Agent, or Firm* — Reinhart Boerner Van Deuren s.c.

(57) ABSTRACT

An acoustic panel for indoor use, where the panel is a molded synthetic foam and is designed to absorb sound waves. The acoustic panel can take the form of a barrier, partition, or screen, and can mimic the effect that soft furnishings would normally have. The acoustic panel can be designed to absorb unwanted noise.

19 Claims, 5 Drawing Sheets (51) Int. Cl.

| | | |
|---|---|---|
| *B29C 44/56* | (2006.01) | |
| *G10K 11/168* | (2006.01) | |
| *B29K 75/00* | (2006.01) | |
| *B29K 77/00* | (2006.01) | |
| *B29L 7/00* | (2006.01) | |
| *E04B 1/74* | (2006.01) | |
| *E04B 1/82* | (2006.01) | |

(52) U.S. Cl.
CPC ...... *B29K 2075/00* (2013.01); *B29K 2077/10* (2013.01); *B29L 2007/002* (2013.01); *E04B 2001/742* (2013.01); *E04B 2001/8245* (2013.01)

(58) Field of Classification Search
USPC .......................................................... 181/286
See application file for complete search history.

(56) References Cited

U.S. PATENT DOCUMENTS

| | | | | |
|---|---|---|---|---|
| 2005/0150720 A1* | 7/2005 | Tudor | ................... | G10K 11/162 |
| | | | | 181/286 |
| 2005/0217933 A1* | 10/2005 | Sung Young | ......... | B60R 13/083 |
| | | | | 181/290 |
| 2009/0000864 A1* | 1/2009 | Schnitta | ................ | E04B 1/8209 |
| | | | | 181/286 |
| 2009/0277715 A1* | 11/2009 | Scharer | ................... | A47B 47/00 |
| | | | | 181/286 |
| 2010/0065366 A1* | 3/2010 | Soltau | ................... | G10K 11/168 |
| | | | | 181/286 |
| 2011/0284319 A1* | 11/2011 | Frederick | ................ | E04B 1/86 |
| | | | | 181/293 |

\* cited by examiner

FIG. 1

| Frequency (Hz) | $\alpha_0$ |
|---|---|
| 50 | |
| 63 | |
| 80 | |
| 100 | 0.17 |
| 125 | 0.22 |
| 160 | 0.29 |
| 200 | 0.36 |
| 250 | 0.45 |
| 315 | 0.62 |
| 400 | 0.81 |
| 500 | 0.92 |
| 630 | 0.91 |
| 800 | 0.89 |
| 1000 | 0.83 |
| 1250 | 0.76 |
| 1600 | 0.71 |
| 2000 | 0.78 |
| 2500 | 0.85 |
| 3150 | 0.82 |
| 4000 | 0.76 |
| 5000 | 0.82 |
| 6300 | |
| 8000 | |
| 10000 | |

| Frequency (Hz) | α₀ |
|---|---|
| 50 | |
| 63 | |
| 80 | |
| 100 | 0.13 |
| 125 | 0.15 |
| 160 | 0.19 |
| 200 | 0.21 |
| 250 | 0.25 |
| 315 | 0.28 |
| 400 | 0.43 |
| 500 | 0.59 |
| 630 | 0.74 |
| 800 | 0.84 |
| 1000 | 0.91 |
| 1250 | 0.95 |
| 1600 | 0.89 |
| 2000 | 0.85 |
| 2500 | 0.80 |
| 3150 | 0.94 |
| 4000 | 0.98 |
| 5000 | 0.89 |
| 6300 | |
| 8000 | |
| 10000 | |

FIG. 5

| Frequency (Hz) | $\alpha_s$ | $\alpha_p$ |
|---|---|---|
| 50 | | |
| 63 | | |
| 80 | | |
| 100 | 0.17 | |
| 125 | 0.21 | 0.25 |
| 160 | 0.34 | |
| 200 | 0.48 | |
| 250 | 0.70 | 0.65 |
| 315 | 0.75 | |
| 400 | 0.75 | |
| 500 | 0.73 | 0.75 |
| 630 | 0.71 | |
| 800 | 0.73 | |
| 1000 | 0.78 | 0.75 |
| 1250 | 0.81 | |
| 1600 | 0.82 | |
| 2000 | 0.87 | 0.85 |
| 2500 | 0.87 | |
| 3150 | 0.85 | |
| 4000 | 0.88 | 0.85 |
| 5000 | 0.87 | |
| 6300 | | |
| 8000 | | |
| 10000 | | |

ACOUSTIC PANEL

CROSS-REFERENCE TO RELATED APPLICATIONS

This patent application is the national entry of International Patent Application No. PCT/EP2014/065960, filed on Jul. 24, 2014, also entitled "Acoustic Panel," which in turn claimed the benefit of Great Britain Patent Application No. 1313230.3, filed on Jul. 24, 2013, again entitled "Acoustic Panel," both of which are assigned to the assignee of the present invention and both of which are hereby incorporated herein by reference in their entirety.

BACKGROUND OF THE INVENTION

Field of the Invention

The present invention relates to an acoustic panel which has the ability to absorb sound waves.

Spaces within buildings can be noisy. Soft furnishings are usually used within homes which help to absorb sound waves. In areas where there are insufficient soft furnishings, airborne sound waves reflect from walls and floors. This can become a problem in large, open spaces where soft furnishings are minimal, such as in open-plan offices, hospitals, and schools. The presence of large numbers of people can exacerbate the problem.

Noise can be defined as an unwanted sound. In the workplace, noise is a sound which interferes with normal activities, and can be extremely annoying or disruptive, reducing efficiency or preventing effective communication.

Sound waves are formed by waves of pressure that propagate through a compressible media, such as air. Waves can be reflected, refracted, or attenuated by the material through which they are travelling. Whether a noise is disturbing depends on two main factors: the frequency of the sound wave; and the pressure at which it reaches the ear (measured in decibels).

Generally, the levels of noise in office areas are below levels which pose a risk to hearing. Human hearing is not equally sensitive at all frequencies; although sensitivity is quite good in the range of 1 kHz to 4 kHz. Maximum sensitivity is usually around 3 kHz for people with normal hearing. The noise that is generated by conversation tends to have an audio frequency of between approximately 200 Hz and 8.2 kHz, but because of the limitations on hearing sensitivity, the range of interest for noise reduction is between about 500 Hz to about 8 kHz. White noise is generally considered to be less disturbing, and has the sound energy uniformly spread over a range of frequencies.

Noise can be generated internally, by people and equipment (telephones, photocopiers, printers, lifts, air conditioning, etc.) within a building. External noise can also enter a building, examples of which include road, air, and rail traffic as well as general industrial noise. Environmental noise can affect a person's performance of tasks such as reading and writing. Noise that prevents a person from understanding an instruction or a warning signal may also be a risk to safety. Generally, in an office environment, some privacy during conversations is required, and excessive noise levels can disrupt communication. In an environment such as a hospital, unwanted noise can affect a patient's sleep and comfort, and it is clearly desirable to reduce noise as much as possible.

A normal conversation between two people takes place at about 60 decibels. Often, background office noise, including distant conversations, reaches about 45-55 decibels. When workers are placed close together or in rooms with many people talking at the same time, decibel levels can rise to 70 or higher. A person sitting at a distance of 2 meters from a ringing telephone can be exposed to 70 decibels. If there is a lot of background noise, people will raise their voices to be heard, which further exacerbates the problem. Studies have shown that continuous exposure to noise levels over 60 decibels can affect a person's attention span, and may even increase stress levels.

Where noise is a potential issue, sound absorbent materials can be used, which include the use of insulating floor coverings, wall panels, ceiling panels, and acoustic dividing screens. Any materials used to assist with the absorption of sound need to comply with local fire safety regulations.

One method of reducing or controlling the noise level in this type of space is to use an acoustic or sound absorbing panel which is designed to absorb the sound within a room and to help reduce the amount of reverberation or echo within the space. The acoustic panel may take the form of a barrier, partition, or screen, and may form a dividing wall or may be fixed to a surface (such as a wall).

In addition to room dividers, sound absorbing panels are often fitted to walls in indoor spaces. This mimics the effect that soft furnishings would normally have. In certain environments (e.g. an office or a hospital), traditional soft furnishings are not appropriate and sound absorbing wall panels can provide a suitable alternative, even where space is limited. Conventionally, sound absorbing panels or dividing screens are formed from a plywood substrate covered in a layer of soft foam (also known as sheet foam), optionally further covered by a layer of fabric.

The subject matter discussed in this background of the invention section should not be assumed to be prior art merely as a result of its mention in the background of the invention section. Similarly, a problem mentioned in the background of the invention section or associated with the subject matter of the background of the invention section should not be assumed to have been previously recognized in the prior art. The subject matter in the background of the invention section merely represents different approaches, which in and of themselves may also be inventions.

SUMMARY OF THE INVENTION

According to the present invention there is provided a sound absorbing panel for indoor use, where the panel includes molded synthetic foam and the panel has a normal incidence sound absorption coefficient of greater than 0.5 at frequencies in the range of 500 Hz to 5 kHz.

Examples of the types of building in which sound absorbing panels could be used include offices, schools, day centres, universities, colleges, museums, exhibitions (and exhibition halls), hostels, hotels and hotel rooms, hospitals, public buildings/halls, retailers, restaurants, and casinos; although an acoustic panel can be used whenever it is desirable to change the way sound travels through a given space.

In an apparatus embodiment of the present invention, a sound absorbing panel for indoor use includes molded synthetic foam with the panel having a normal incidence sound absorption coefficient of greater than 0.5 at frequencies between 500 Hz and 5 kHz. In one embodiment, the sound absorbing panel may be a piece of furniture for indoor use. In another embodiment, the sound absorbing panel may have a curved surface.

In two further alternate embodiments, the sound absorbing panel may be formed from a semi-rigid molded synthetic foam or formed from synthetic foam which is further supported by a framework. In two other alternate embodiments, the synthetic foam may be further covered by a layer of fabric, or the synthetic foam may be further provided with a layer of textured material. In two additional alternate embodiments, the synthetic foam may be molded polyurethane foam or the synthetic foam may be formed from a melamine resin.

In five additional alternate embodiments the sound absorbing panel may have a normal incidence sound absorption coefficient of greater than 0.4 at frequencies between 400 Hz and 5 kHz, or the sound absorbing panel may have a normal incidence sound absorption coefficient of greater than 0.7 at frequencies between 800 Hz and 5 kHz, or the sound absorbing panel may have a normal incidence sound absorption coefficient of greater than 0.7 at a frequency of 3 kHz, or the sound absorbing panel may have a normal incidence sound absorption coefficient equal to or greater than 0.75 at a frequency of 2500 Hz, or the sound absorbing panel may have a practical sound absorption coefficient equal to or greater than 0.65 at frequencies of 250 Hz and higher. In yet another embodiment, the sound absorbing panel may have a weighted sound absorption coefficient of about 0.8 or higher.

In a method embodiment of the present invention, the sound absorbing panel may be formed from synthetic foam which is cold-poured into a preformed mold. In two alternate embodiments, the synthetic foam may be a polyurethane foam, or the synthetic foam may be formed from a melamine resin. In one embodiment, the method may include the steps of mixing a polyol component with an isocyanate component using a high intensity mixer, pouring the mixture into a preformed mold, waiting for the foam to set, removing the mold, and optionally removing the outer layer from the foam product. In two further alternate embodiments, the temperature of the polyol component and the isocyanate component may be controlled, and/or the temperature of the mold may be controlled.

DESCRIPTION OF THE DRAWINGS

The present invention may be described with reference to figures, in which.

DETAILED DESCRIPTION OF AN EXEMPLARY EMBODIMENT

When an airborne sound wave meets a rigid surface, most of the wave is reflected, and only a fraction of the sound energy enters the material. When a foam with open cells is used, the airborne wave continues into the foam structure. The sound wave then propagates through the pores, and the sound pressure is reduced by the friction of air against the pore walls. If the foam is sufficiently soft, even the cell walls can be moved by the sound wave, further reducing the remaining energy of the sound wave. The further the wave travels through the foam, the more damping or attenuation occurs. The foam thickness therefore becomes an important parameter for absorption performance.

If the foam thickness is constant, the next parameter that requires optimisation is the amount of friction between air and the foam. The pore diameter (or flow resistivity) of the cells in the foam tends to have a large influence. When an airborne sound wave hits a rigid surface, it is mainly reflected. However, when a sound wave hits a synthetic foam, the sound wave can drive the air into the foam structure. The pressure of the sound wave is reduced by friction of the air against the pore walls. If the foam is sufficiently soft, the air may even move the cell membranes. In order to transfer energy from the air to the foam, the surface interaction should be large. Open-celled foams are thus particularly suitable for sound absorption.

The viscosity of the material through which the sound wave travels affects the rate at which sound is absorbed or attenuated. The effectiveness of a sound absorption material for noise abatement can be characterized by the absorption coefficient (or attenuation coefficient). The absorption coefficient describes how easily a material is permeated by a sound wave. The normal incidence sound absorption coefficient is a measure of the sound absorption when the sound waves travel directly towards the material at an incidence angle of 0°, and is therefore easy to compare with the same measurement on other materials. A large absorption coefficient means that the beam is quickly absorbed (or attenuated/weakened) as it passes through the medium, whilst a small absorption coefficient means that the medium is relatively transparent to the beam.

The absorption coefficient α of a material is defined as:

$$\alpha = 1 - [R_r/R_i]$$

Where:
$R_i$=incident sound wave pressure
$R_r$=reflected sound wave pressure
Acoustic absorption increases when:
the amount of accessible pores increase (with increasing acoustic porosity or open cell content and within certain ranges),
the pore diameter decreases,
the flow resistivity increases.
The acoustic absorption properties are also influenced by the frame flexibility.

A sound absorbing panel is formed from an open-cell synthetic foam, which can be cold poured in to a pre-formed mold to achieve the desired shape.

A suitable synthetic foam for use as the sound absorbing panel could be a polyurethane foam. The advantages of the polyurethane foam are two-fold; firstly, polyurethane foams exhibit excellent sound absorption capabilities over a wide range of frequencies, and secondly, the polyurethane can be cold-poured into a pre-formed mold of any desired shape. This allows the low cost manufacture of a range of sound absorbing shapes and structures.

As an alternative to polyurethane foam, an open-cell flexible foam can also be formed from a melamine resin. The melamine resin-based foam also exhibits thermosetting properties and high sound absorption capacity. One example of a suitable melamine-based foam is Basotect® G (BASO- TECT is a registered trademark of BASF SA). In addition, melamine resin-based foams exhibit a high level of fire retardance.

Another alternative to polyurethane foam could include foams formed from natural oil polyols ("NOP's"), or biopolyols. These could include foams produced from soy-based polyols, i.e., foams formed from soybean derivatives. Soy-based polymers have physical properties comparable to polyurethane, and can present a more environmental friendly alternative to petrochemical-based foams.

Polyurethane can produce foams with a variety of different physical characteristics. Both polyurethane foam and melamine resin-based synthetic foams can be used to create acoustic panels that are suitable for use within an indoor or office environment. The synthetic foams can exhibit acoustic absorption values that exceed the standards for commercial office furniture. The preferred form of synthetic foam is a semi-rigid foam, which would have the necessary rigidity for use as an acoustic panel without the need for an additional rigid support. The foam may be a microcellular foam, and may be produced using a cold-curing process.

In order to produce polyurethane foam, a polyol component is reacted with isocyanate. To form a foam of higher density, polyurethane can be further reacted with isocyanate in a isocyanate trimerization reaction. A catalyst may be used to enhance this reaction. The isocyanate component reacts with water to form ureas and CO, gas. The isocyanate component is often supplied to the reaction in the form of diphenylmethane diisocyanate ("MDI") or toluene diisocyanate ("TDI"). MDI is used for flexible, semi-rigid and rigid foam production; however, TDI is only used to produce flexible foams.

The polyol component is slightly hygroscopic and tends to absorb water. The polyol component can be a polyether polyol, for example. Polyether polyols can be used to form both rigid and flexible foams. When the polyol component and the isocyanate are combined, high intensity mixing is required to ensure that the ingredients are properly mixed during the short reaction time.

It is also possible to use "ready-to-mix" starter materials, which when combined, readily form polyurethane foam. These products are available in an "off-the-shelf" form with predetermined ratios of polyol and isocyanate, and are often supplied in two-component forms. The starter materials are formulated to result in a specific foam density, provided that the instructions for casting conditions are followed. One example of this type of foam is Bayfit® SA cold-cured molded polyurethane foam which is formed by mixing an isocyanate component Desmodur® (VPU.PU 70SA91) with Bayfit® (VPU.PU 20SA90) (DESMODUR and BAYFIT are registered trademarks of Bayer AG). The Desmodur® component is an MDI-based material and provides the isocyanate compounds, while the Bayfit® component provides the polyurethane. The two components are mixed at a set ratio, for example, 100 parts by weight of Bayfit® and 55 parts by weight Desmodur®. The ratio of the isocyanate component to the polyol component depends on the foam density required. Other suitable polyol starter materials include products from the Hyperlite®, Desmophen®, and Bayfill® (HYPERLITE, DESMOPHEN, and BAYFILL are registered trademarks of Bayer AG) ranges, to name a few examples. A polyurethane with a low amine content can also be used.

High-density microcellular foams can be formed without the addition of blowing agents by mechanically frothing/agitating or nucleating the polyol components prior to use. Blowing agents can affect the flame resistance of the foam product (pentane is typically used for low-density foam manufacturing processes). To avoid the use of blowing agents, mechanical agitation may involve the use of a high intensity mixer (pressure/speed), causing the chemicals to become impinged together. The process of manufacturing polyurethane foam can be known as reaction injection molding ("RIM"). Once the mixture is uniform, it can then be poured from the mixing head into a mold. It is preferable to pour the foam immediately after mixing.

The foam density is adjustable, depending on the reaction ingredients, their quantities, and the reaction conditions (e.g., reaction temperature). Generally, reaction temperatures can be slightly above ambient (e.g., 24° C.-29° C.); however, if a lower foam density is required, higher temperatures can be used. Lower temperatures result in less expansion of the foam (i.e., a foam with a higher density).

The resulting synthetic foam (which may be, for example, a melamine-based or a polyurethane-based foam) can be poured into a mold of any shape. Therefore, the range of structures that can be created at low cost/high throughput is greater than those for traditional acoustic panels (compared with, for example, a plywood board covered in a layer of foam and fabric). Three-dimensional shapes can be formed at low cost compared with conventional methods. The use of a mold to form the panel results in a greater degree of design freedom. The thickness of the panel, and thus the sound absorbing properties of the panel, can be easily controlled using the shape of the mold. Ideally, the mold should be non-porous and well-sealed. Preferably, any moisture should be removed from the inner surface of the mold, to prevent the foam from adhering to the inner surface. The temperature of the mold can be raised to reduce curing time.

Most synthetic foams have a relatively short curing time. The curing time required varies depending on the specific components of the foam, the thickness and size of the foam product, and the temperature of the curing environment. Most foams have curing time of less than 24 hours after pouring into the mold, although curing is normally completed much sooner. For example, the use of 55 parts by weight Bayfit® with 100 parts by weight Desmodur® at laboratory scale, at a temperature of about 35° C. in a metal mold maintained at a temperature of about 60° C. resulted in a foam that was ready to be removed from the mold about one minute after being poured into the mold. In general, curing times can range from 20 seconds to 24 hours. As curing times are relatively short, the use of synthetic foams results in reduced production times, particularly compared to conventional plywood and foam boards. When a curved or complicated shaped panel is required, the production times can be much shorter than those involving conventional methods.

The skin (or surface layer) that is formed on the surface of the foam during the curing process can be removed from the cured foam, or left on the surface. Removal of the skin can alter the sound absorbing properties. The thickness of the skin can be altered and controlled by the manufacturing method.

The resulting sound-absorbing structure formed from the synthetic foam can be further provided with a fabric covering, to alter the acoustic absorption properties. An additional layer of textured material can be provided on the surface of the synthetic foam, either beneath a fabric covering or in place of a fabric covering. The surface of the synthetic foam may be perforated to alter the acoustic absorption properties.

Modular room dividing systems can be created using the molded panels. As molded panels can be manufactured at low cost in a range of shapes, it is possible to form panels with curved surfaces, or surfaces which are designed to deflect (or re-direct) and diffuse sound waves. The acoustic panels can have surfaces which deflect noise in the direction of the floor or ceiling, for example.

The synthetic foam can optionally be mounted in a frame for enhanced strength, or in order to retain a desired shape or structure. The use of a frame or framework can be particularly desirable for stand-alone panels, such as wall dividers.

An advantage of being able to control the thickness of the panel through the shape of the mold is the degree of freedom offered in terms of the resulting panel's shape and thickness. The panel can be formed to be relatively thin, compared with conventional sheet foam panels. When using conventional sheet foam, to form a 12 mm thick panel, for example, two sheets of 4 mm thick sheet foam would be attached to a 4 mm thick substrate, such as a board. Such panels have reduced sound adsorption properties in comparison to the present invention. The molding of a synthetic foam allows a 12 mm thick panel of foam to be formed which can be used as a wall panel or mounted within a frame if used as a stand-alone panel.

The sound adsorption properties of the panel can be controlled using three main variables: the shape of the panel; the thickness of the panel; and the foam density of the panel. The foam density is influenced by the chemical composition, the curing time, and the curing temperature. The ability to control all of these variables results in a far greater range of adsorbent properties becoming readily available. Different applications require good sound adsorption properties in different frequency ranges. By using the molding technique of the present invention it is possible to manufacture an acoustic panel with adsorption properties which are tailored for the desired application.

Some examples of synthetic foam panels prepared in accordance with the present invention were tested to measure their sound absorption properties. The results of these tests are provided below.

EXAMPLES

The present invention is further exemplified with the following examples, with reference to the drawings.

The measurements displayed in the graphs in FIGS. 1 to 4 were conducted according to Test Method 1 as described below. The results displayed in graph in FIG. 5 were measured according to Test Method 2 as described below.

The normal incidence sound absorption coefficient ($\alpha_0$) of the following sound absorption panels was measured using a standing wave tube apparatus. The measurements were conducted by an independent analytical group specializing in acoustic measurements. The panels that were tested in the following examples were all formed from poured synthetic foam.

Equipment Used:
Brüel & Kjær Type 4002 Standing Wave Apparatus (Serial No. 27491)
Norsonic 840 Real Time Analyzer (Serial No. 16009)
Brüel & Kjær 2619 Microphone Pre-Amplifier (Serial No. 840541)
Dawe 440B Audio Oscillator (Serial No. 3490)
Fluke 8060B Multimeter (Serial No. 5035026)
Test Method 1

The normal incidence sound absorption coefficient of a sample can be measured by investigating the sound field when a plane wave is reflected by the sample mounted in a standing wave tube. This consists of a long rigid-walled tube with a loudspeaker at one end and the sample mounted at the other end against a reflecting surface. The loudspeaker is driven with a sinusoidal signal at a single frequency which propagates as a plane wave along the tube. The sound wave therefore strikes the sample at normal incidence (angle of incidence=0 degrees).

A Brüel & Kjær Type 4002 Standing Wave Apparatus was used for the tests. The apparatus provides tubes of two different sizes. The larger tube is used for measurements performed at the lower frequencies of 100 Hz to 1600 Hz, and the smaller tube is used for measurements performed at the higher frequencies of 800 Hz to 5000 Hz. Samples with diameters of 99 mm and 29 mm are required for the larger and smaller tubes respectively.

At each measurement frequency a standing wave pattern is set up in the tube, with a pressure maximum occurring approximately at the surface of the sample. A pressure minimum will be formed at a distance equal to one quarter of a wavelength back from this maximum, with further maxima and minima at successive one quarter wavelengths.

The normal incidence sound absorption coefficient ($\alpha_0$) of the specimen is calculated using the following formula:

$$\alpha_0 = \frac{4n}{(n+1)^2}$$

where:
$n = 10^{(L_{max}-L_{min})/20}$
$L_{max}$ and $L_{min}$ are the sound pressure levels in the standing wave tube at successive maxima and minima (dB).

The measurements were performed using two examples of the specimen in each tube. The recorded results are an average of the two measurements.

At the frequencies of 800 Hz to 1600 Hz, an average was also taken of the results from both the larger and smaller tubes.

The normal incidence sound absorption coefficient is an absolute physical constant of a material under the specific conditions of normal incidence. However, the effect upon the acoustic environment will be influenced by the method of mounting and the distribution of the material or system within a space, and therefore the date for normal incidence sound absorption coefficient may not be identical to the sound absorption coefficient during practical use. The normal incidence sound absorption coefficient does provide a comparative measure of the level of sound absorption between different materials.

Figure 1:
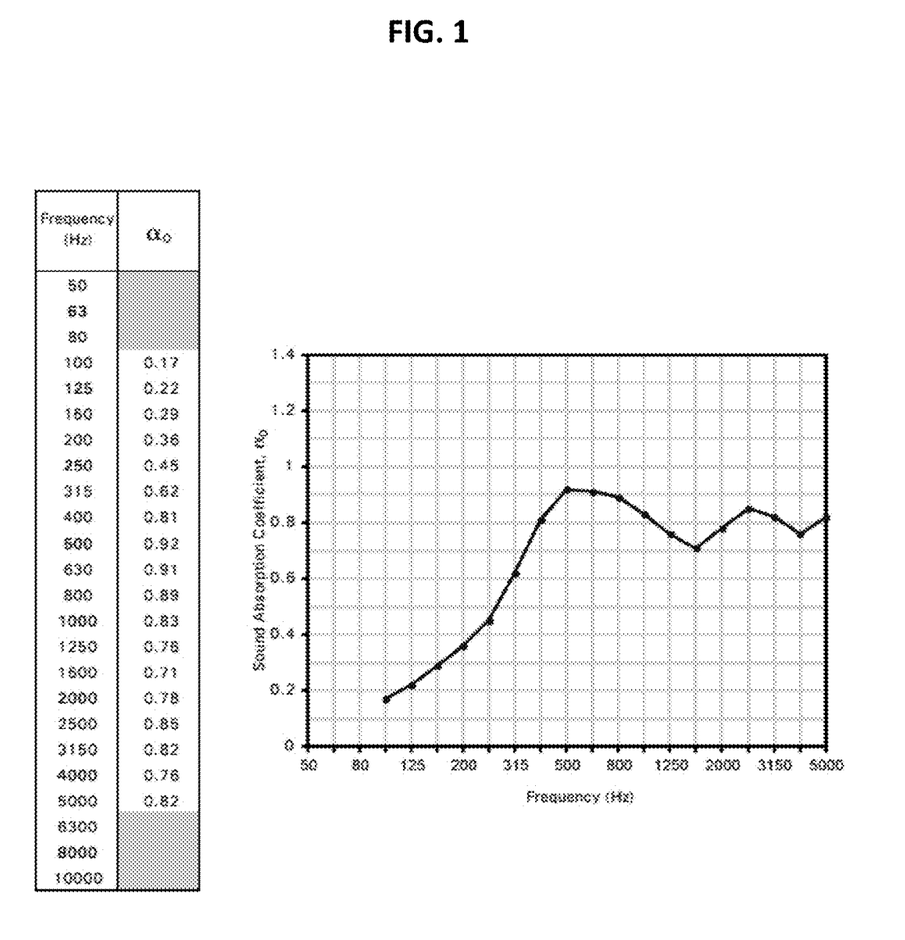
FIG. 1 is a graph showing the normal incidence sound absorption coefficient measured at different frequencies for Sample A.
Figure 2:
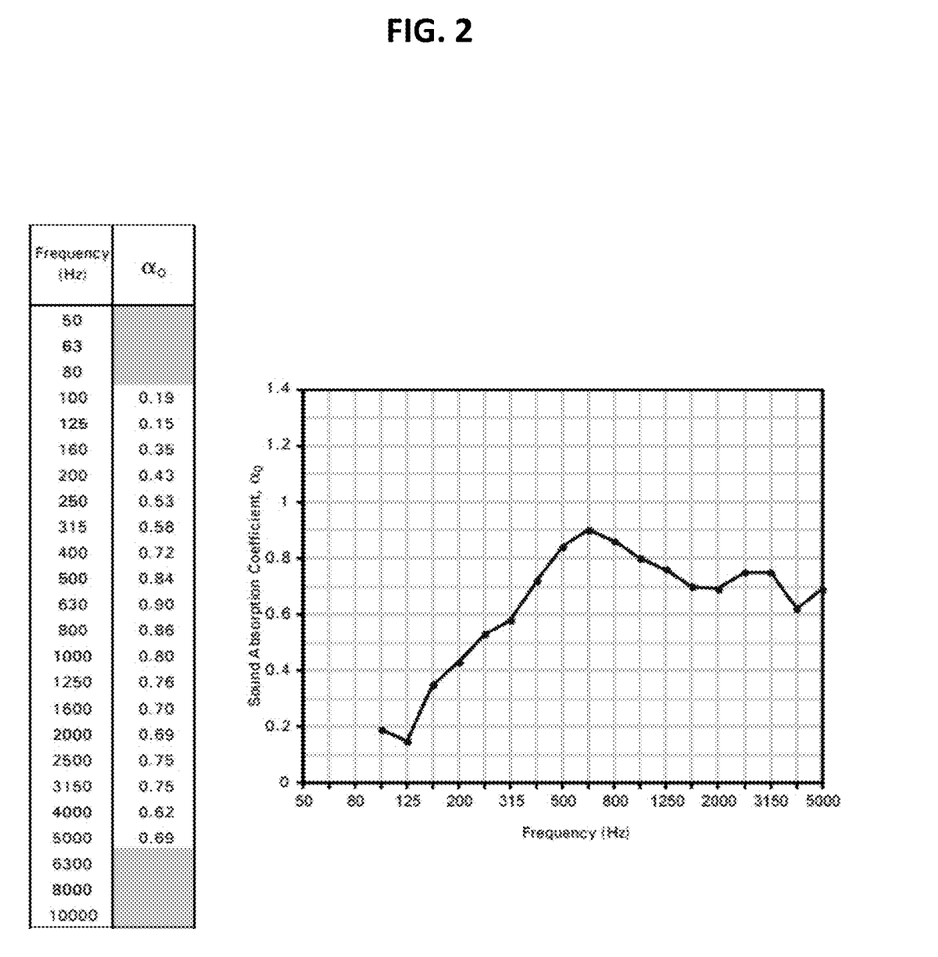
FIG. 2 is a graph showing the normal incidence sound absorption coefficient measured at different frequencies for Sample B.
Figure 3:
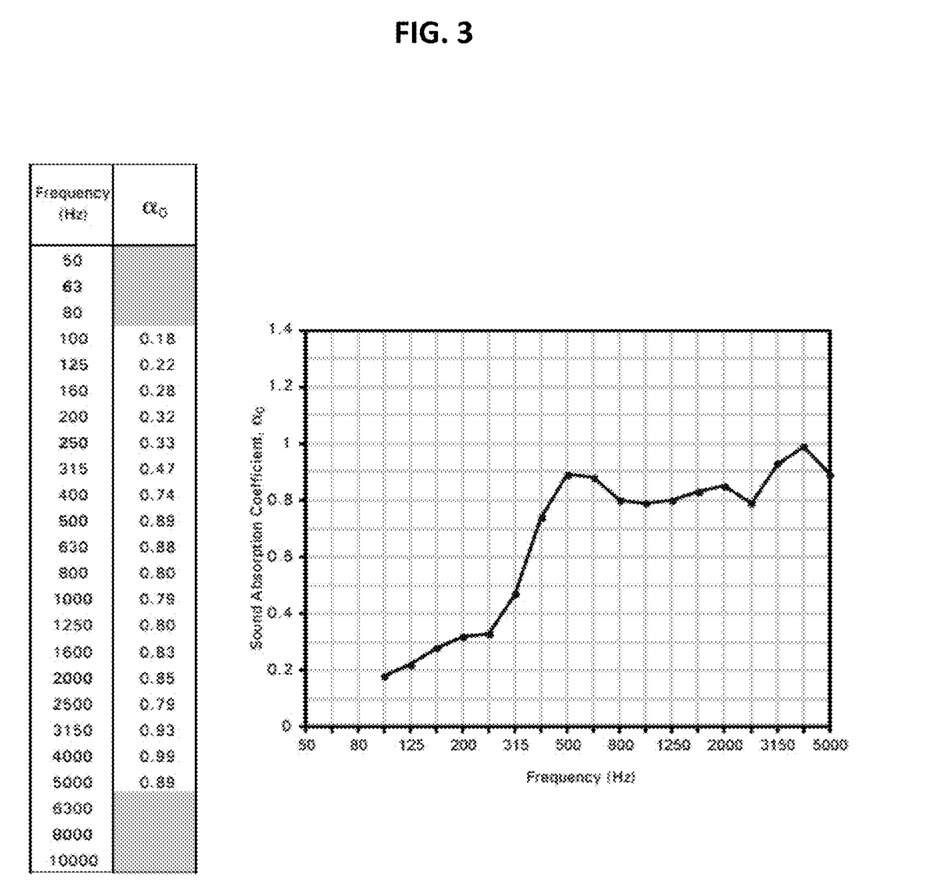
FIG. 3 is a graph showing the normal incidence sound absorption coefficient measured at different frequencies for Sample C.
Figure 4:
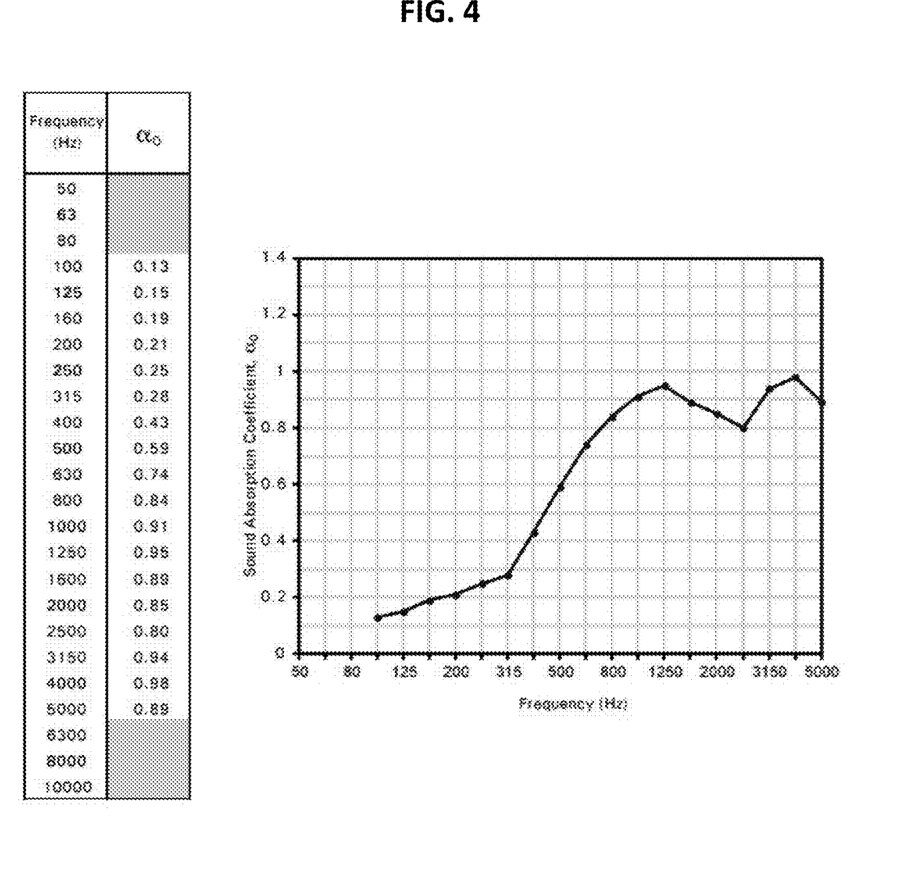
FIG. 4 is a graph showing the normal incidence sound absorption coefficient measured at different frequencies for Sample D.

The results of the tests are shown in FIGS. 1 to 4.
FIG. 1: Sample A
A 56 mm thick poured polyurethane foam with a fabric layer with the skin from the mold left intact. Mass per unit area: 3.0 kg/m$^2$.
FIG. 2: Sample B
A 56 mm thick poured polyurethane foam with the skin from the mold left intact. The faces of the sample were perforated—in a grid pattern of approximately 10 mm by 10 mm. Mass per unit area: 3.0 kg/m$^2$.
FIG. 3: Sample C
A poured PU foam with the skin from the polyurethane mold removed to form a sample 48 mm thick. Mass per unit area: 2.2 kg/m$^2$.
FIG. 4: Sample D
Two foam samples formed from Basotect® G foam, each nominally 25 mm thick, set back-to-back to form a 49 mm thick sample. Mass per unit area: 1.2 kg/m². The foam is manufactured in the form of untrimmed blocks comprising a thin outer skin.

As can be seen from the attached figures, the four examples of panels formed from synthetic foam exhibit a normal incidence sound absorption coefficient of greater than 0.5 at frequencies of between 500 Hz and 5 kHz. By adjusting the properties of the panel (foam density and panel thickness), the sound absorption properties can be adjusted to suit the desired application.

Two of the examples, Sample C and Sample D, exhibit a normal incidence sound absorption coefficient of greater than 0.7 at frequencies in the range of 630 Hz to 5 kHz. In fact, these samples exhibit a normal incidence sound absorption coefficient of at least around 0.8 at frequencies between 800 Hz and 5 kHz.

At a frequency of 3 kHz, the samples all demonstrated a normal incidence sound absorption coefficient of greater than 0.7. Further, at this frequency the samples all demonstrated a normal incidence sound absorption coefficient of greater than 0.74.

At a frequency of 2500 Hz, the samples all demonstrated a normal incidence sound absorption coefficient of greater than 0.75.

Sample E

A further test was performed in order to measure the sound absorption coefficient ($\alpha_s$) of a polyurethane foam panel, which was approximately 50 mm thick. Each panel included an internal metal framework, with curved panel corners and edges. The panel dimensions were 1600 mm long×380 mm high×50 mm thick.

Test Method 2

Specimen area: 10.81 m² Mass per unit area: 7.7 kg/m²

| Chamber Conditions | Volume | Air Temperature | Relative Humidity | Air Pressure |
|---|---|---|---|---|
| Empty Chamber | 221 m³ | 20° C. | 80% | 1000 mbar |
| Chamber with Specimen | 221 m³ | 20° C. | 80% | 1000 mbar |

Equipment Used

Norsonic 840 Real Time Analyser (Serial No. 16009)
Brüel & Kjær 4165½" Condenser microphone (Serial No. 1042002)
Brüel & Kjær 4165½ " Condenser microphone (Serial No. 1471398)
Brüel & Kjær 2669 Microphone Pre-Amplifier (Serial No. 1856926)
Brüel & Kjær 2669 Microphone Pre-Amplifier (Serial No. 2221217)

This test was conducted in accordance with British Standard BS EN ISO 354. Single figure ratings of sound absorption performance, known as the weighted sound absorption coefficient ($\alpha_w$) and sound absorption class are derived from the measurements in accordance with British Standard BS EN ISO 11654 along with the Noise Reduction Coefficient (NRC) and Sound absorption Average ("SAA") in accordance with ASTM C423.

An array of panels (2×9) of Sample E were laid directly over the floor of the test chamber to form a rectangle approximately 3.2 m×3.4 m and 50 mm deep. The gap formed in the junction of each block of four panels is filled with damp sand to a depth of approximately 25 mm.

The sound absorption of a specimen was measured under diffuse field conditions where sound was incident upon the specimen from all directions.

The specimen was installed directly over the floor of a purpose built reverberation chamber. The chamber was constructed of a thick reinforced concrete floor and ceiling. The chamber rests on resilient mountings to provide good acoustical isolation from the building exterior. In order to provide good diffusion of the sound field, the walls are non-parallel, the ceiling is pitched, and the ceiling includes twenty randomly suspended diffuser panels within a surface area of approximately 37 m².

A steady sound source with a continuous spectrum in the frequency band of interest was used to drive an omnidirectional loudspeaker which is located in the chamber. The reverberation times of the chamber were determined using the interrupted noise method with three decay measurements made at each of four microphone positions for each of three loudspeaker positions in order to obtain a good average at each of the one-third octave intervals from 100 Hz to 5,000 Hz, in accordance with the Standard. The test was conducted with the specimen installed within the chamber, then repeated in the absence of the specimen and any associated framework.

The sound absorption coefficient ($\epsilon_s$) of the specimen was calculated using the following formula:

$$\alpha_s = 55.3 \frac{V}{S}\left(\frac{1}{c_2 T_2} - \frac{1}{c_1 T_1}\right) - 4V(m_2 - m_1)$$

where:
V is the volume of the empty reverberation chamber
S is the area of the test specimen (m²)
$T_1$ is the mean reverberation time of the empty reverberation chamber
$T_2$ is the mean reverberation time of the reverberation chamber with the test specimen installed (seconds)
$m_1$ and $m_2$ are the power attenuation coefficient at $T_1$ and $T_2$ calculated according to ISO 9613:1993
$c_1$ and $c_2$ are the velocity of sound calculated from the following formula:

$c=331+0.6t$ where t is the air temperature of the reverberation chamber (Celsius)

The Standard requires that the specimen and chamber should be environmentally stable before testing can commence. All equipment was calibrated in accordance with National Standards (calibration traceable via an unbroken chain). It is possible for coefficients greater than unity to be measured due to the diffraction effects at the boundaries of finite specimens. Where this occurs, the Standard requires that no "correction" term be applied.

Octave band values of Practical Sound Absorption Coefficient ($\alpha_p$) are calculated from the one-third octave results. The Weighted Sound Absorption Coefficient ($\alpha_w$) was calculated by comparing the five values of $\alpha_p$ from 250 Hz to 4,000 Hz with a defined reference curve which was moved towards the measured values until the requirements of BS EN ISO 11654:1997 were met. From the $\alpha_w$ the Sound Absorption Class was also determined.

In addition, the Noise Reduction Coefficient ("NRC") was calculated from the four $\alpha_s$ results at the octave centre frequencies from 250 Hz to 2,000 Hz (rounded to 0.05), and the Sound Absorption Average ("SAA") was calculated from the twelve $\alpha_s$ results from 200 Hz to 2,500 Hz (rounded to 0.01), both in accordance with ASTM C423-08. The NRC was found to be approximately 0.75 and the SAA was found to be approximately 0.75.

Figure 5:
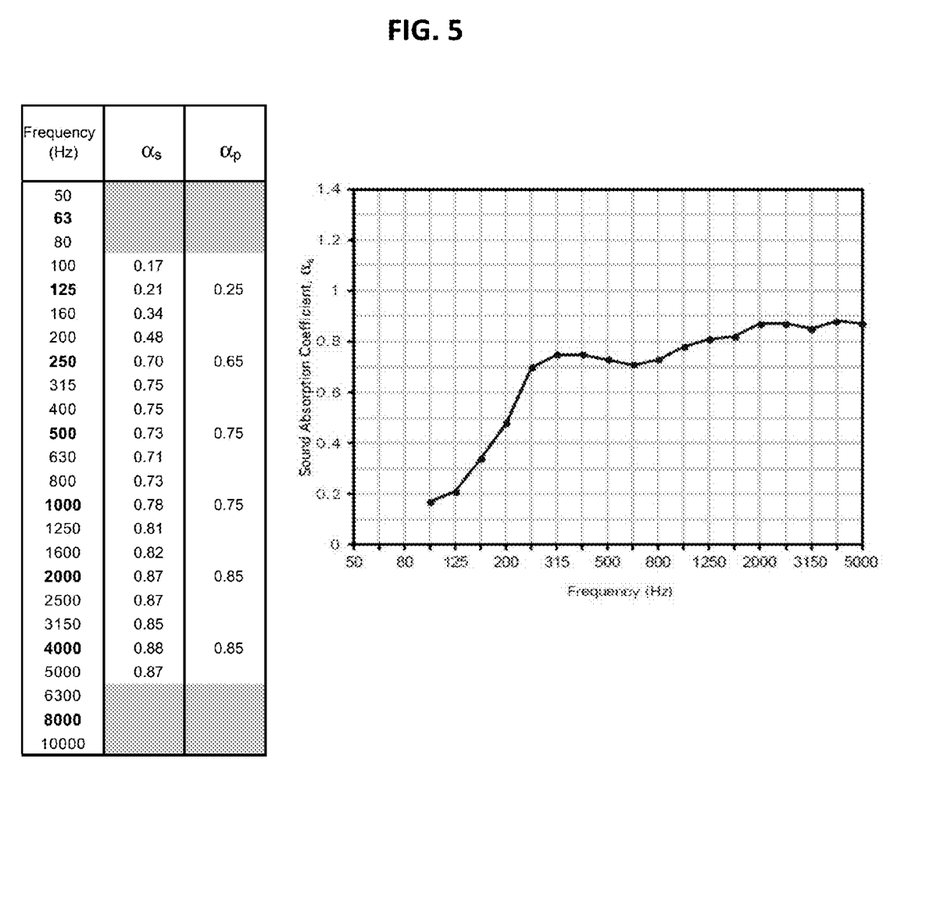
FIG. 5 is a graph showing the sound absorption coefficient of Sample E measured at different frequencies in an empty chamber.

FIG. 5: Sample E

The polyurethane panel of sample E demonstrated a sound absorption coefficient of greater than 0.4 at frequencies of between 200 Hz and 5,000 Hz. Further, the sound absorption coefficient was seen to exceed 0.7 at frequencies of over 300 Hz; for example at frequencies in the range of 300 Hz to 5,000 Hz the sound absorption coefficient was greater than 0.7. The Practical Sound Absorption Coefficient of Sample E was greater than 0.65 at frequencies of 250 Hz and higher. Sample E was found to have a rating of Sound Absorption Class B, according to BS EN ISO 11654:1997, with an $\alpha_w$ of approximately 0.80.

The choice of foam used for a sound absorbing panel would depend on the frequency of the noise which is to be absorbed, as some of the samples performed slightly better at lower frequencies (e.g., Sample A and B), and some of the samples performed better at higher frequencies (e.g., Sample C and D). This further demonstrates the ability to customize the foam's sound absorption properties in order to tailor the foam to the desired application. These samples are just a few examples of the types of foam what would be suitable for use in a sound absorbing panel.

The effect of the panel upon the acoustic environment is further influenced by the method of mounting and the distribution of the material or panel system within a given space.

The advantages of these panels are that they have adjustable sound absorption properties, and that they can be easily, quickly, and cheaply formed into any desired shape.

Although the foregoing description of the present invention has been shown and described with reference to particular embodiments and applications thereof, it has been presented for purposes of illustration and description and is not intended to be exhaustive or to limit the invention to the particular embodiments and applications disclosed. It will be apparent to those having ordinary skill in the art that a number of changes, modifications, variations, or alterations to the invention as described herein may be made, none of which depart from the spirit or scope of the present invention. The particular embodiments and applications were chosen and described to provide the best illustration of the principles of the invention and its practical application to thereby enable one of ordinary skill in the art to utilize the invention in various embodiments and with various modifications as are suited to the particular use contemplated. All such changes, modifications, variations, and alterations should therefore be seen as being within the scope of the present invention as determined by the appended claims when interpreted in accordance with the breadth to which they are fairly, legally, and equitably entitled.

While the current application recites particular combinations of features in the claims appended hereto, various embodiments of the invention relate to any combination of any of the features described herein whether or not such combination is currently claimed, and any such combination of features may be claimed in this or future applications. Any of the features, elements, or components of any of the exemplary embodiments discussed above may be claimed alone or in combination with any of the features, elements, or components of any of the other embodiments discussed above.

What is claimed is:

1. A sound absorbing panel for indoor use, wherein the sound absorbing panel comprises:
   molded synthetic foam of either molded polyurethane foam or formed melamine resin; and
   wherein the sound absorbing panel comprises a piece of furniture for indoor use;
   wherein the sound absorbing panel is arranged and configured to have a normal incidence sound absorption coefficient of greater than 0.5 at frequencies between 500 Hz and 5 kHz; and
   wherein the sound absorbing panel is further arranged and configured to have a normal incidence sound absorption coefficient of greater than 0.7 at frequencies between 800 Hz and 5 kHz; and
   wherein the sound absorbing panel is still further arranged and configured to have a practical sound absorption coefficient equal to or greater than 0.65 at frequencies of 250 Hz and higher.

2. A sound absorbing panel according to claim 1, wherein the sound absorbing panel comprises a room divider.

3. A sound absorbing panel according to claim 1, wherein the sound absorbing panel is formed from a semi-rigid molded synthetic foam.

4. A sound absorbing panel according to claim 1, wherein the sound absorbing panel is formed from synthetic foam which is further supported by a framework.

5. A sound absorbing panel according to claim 1, wherein the synthetic foam is further covered by a layer of fabric.

6. A sound absorbing panel according to claim 1, wherein the synthetic foam is further provided with a layer of textured material.

7. A sound absorbing panel according to claim 1, wherein the sound absorbing panel has a normal incidence sound absorption coefficient of greater than 0.4 at frequencies between 400 Hz and 5 kHz.

8. A sound absorbing panel according to claim 1, wherein the sound absorbing panel has a normal incidence sound absorption coefficient of greater than 0.7 at a frequency of 3 kHz.

9. A sound absorbing panel according to claim 1, wherein the sound absorbing panel has a normal incidence sound absorption coefficient equal to or greater than 0.75 at a frequency of 2500 Hz.

10. A sound absorbing panel according to claim 1, wherein the sound absorbing panel has a weighted sound absorption coefficient of about 0.8 or higher.

11. A sound absorbing panel according to claim 1, wherein the sound absorbing panel has a curved surface.

12. A method of manufacturing a sound absorbing panel according to claim 1, wherein the sound absorbing panel is formed from synthetic foam which is cold-poured into a preformed mold.

13. A method of manufacturing a sound absorbing panel in accordance with claim 12, wherein the synthetic foam is a polyurethane foam.

14. A method of manufacturing a sound absorbing panel in accordance with claim 12, comprising the steps of:
   mixing a polyol component with an isocyanate component using a high intensity mixer;
   pouring the mixture into a preformed mold;
   waiting for the foam to set;
   removing the mold; and
   optionally, removing the outer layer from the foam product.

15. A method of manufacturing a sound absorbing panel in accordance with claim 14, wherein the temperature of the polyol component and the isocyanate component is controlled.

16. A method of manufacturing a sound absorbing panel in accordance with claim 14, wherein the temperature of the mold is controlled.

17. A method of manufacturing a sound absorbing panel in accordance with claim 12, wherein the synthetic foam is formed from a melamine resin.

18. A method of manufacturing a sound absorbing panel, comprising the steps of:
   mixing a polyol component with an isocyanate component using a high intensity mixer;
   pouring the mixture into a preformed mold configured to have a cavity in the form of a piece of furniture for indoor use;
   waiting for the mixture to set into a molded synthetic foam segment;
   removing the mold; and
   optionally, removing the outer layer from the foam product;
   wherein the sound absorbing panel manufactured according to this method is configured to have a normal incidence sound absorption coefficient of greater than 0.5 at frequencies between 500 Hz and 5 kHz; and
   wherein the sound absorbing panel is further arranged and configured to have a normal incidence sound absorption coefficient of greater than 0.7 at frequencies between 800 Hz and 5 kHz; and
   wherein the sound absorbing panel is still further arranged and configured to have a practical sound absorption coefficient equal to or greater than 0.65 at frequencies of 250 Hz and higher.

19. A method as defined in claim 18, wherein the preformed mold is configured to have a cavity in the form of a room divider.

* * * * *